(12) United States Patent
Feinmesser et al.

(10) Patent No.: US 10,243,710 B2
(45) Date of Patent: Mar. 26, 2019

(54) SPECTRAL AGGREGATION TO GENERATE A WIDEBAND CHANNEL ESTIMATION

(71) Applicant: Apple Inc., Cupertino, CA (US)

(72) Inventors: Yoav Feinmesser, Tel-Aviv (IL); Rafi Vitory, Or-Akiva (IL)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 15/257,866

(22) Filed: Sep. 6, 2016

(65) Prior Publication Data

US 2018/0070357 A1    Mar. 8, 2018

(51) Int. Cl.
| | |
|---|---|
| *H04W 4/00* | (2018.01) |
| *H04L 5/00* | (2006.01) |
| *G01S 5/00* | (2006.01) |
| *H04W 64/00* | (2009.01) |
| *G01S 5/02* | (2010.01) |
| *G01S 11/02* | (2010.01) |
| *H04W 76/10* | (2018.01) |

(52) U.S. Cl.
CPC ............. *H04L 5/0048* (2013.01); *G01S 5/00* (2013.01); *G01S 5/021* (2013.01); *G01S 11/02* (2013.01); *H04W 64/00* (2013.01); *H04W 76/10* (2018.02)

(58) Field of Classification Search
None
See application file for complete search history.

(56) References Cited

U.S. PATENT DOCUMENTS

| | | | | |
|---|---|---|---|---|
| 2006/0073823 | A1* | 4/2006 | Kent | ................... H04L 25/0204 455/423 |
| 2008/0188237 | A1* | 8/2008 | Alles | ...................... G01S 5/021 455/456.1 |
| 2009/0190679 | A1* | 7/2009 | Lindoff | ............... H04L 25/0228 375/260 |
| 2012/0082257 | A1* | 4/2012 | Kent | ................... H04L 25/0204 375/267 |
| 2012/0300864 | A1* | 11/2012 | Merlin | ................. H04B 7/0617 375/260 |
| 2013/0190026 | A1* | 7/2013 | Agrawal | ............... H04W 28/16 455/507 |
| 2013/0279468 | A1* | 10/2013 | Wan | ...................... H04L 5/0035 370/330 |

(Continued)

*Primary Examiner* — Phirin Sam
(74) *Attorney, Agent, or Firm* — Morgan, Lewis & Bockius LLP

(57) ABSTRACT

A device implementing spectral aggregation to generate a wideband channel estimation may include a processor configured to generate a combined channel estimation for one or more channels. For each channel, the processor may be configured to: transmit a first signal to another device; after an amount of time elapses, open a receive window for facilitating detection of a second signal from the other device; receive the second signal from the other device; generate a first channel estimation based on the second signal; and generate the combined channel estimation based on the first channel estimation and a second channel estimation received from the other device. The processor may be configured to aggregate the combined channel estimation generated for each channel into an aggregated channel estimation. The processor may be configured to estimate a time of arrival for a third signal based on the aggregated channel estimation.

25 Claims, 8 Drawing Sheets

(56) References Cited

U.S. PATENT DOCUMENTS

| | | | |
|---|---|---|---|
| 2015/0124911 A1* | 5/2015 | Wicker, Jr. | H04L 25/0242 375/340 |
| 2015/0280799 A1* | 10/2015 | Kwon | H04L 25/0204 375/267 |
| 2016/0088438 A1* | 3/2016 | O'Keeffe | H04W 4/21 455/456.2 |
| 2016/0149727 A1* | 5/2016 | Hu | H04L 25/0204 370/252 |
| 2016/0227516 A1* | 8/2016 | Nallampatti Ekambaram | H04W 72/04 |
| 2016/0261319 A1* | 9/2016 | Sanderovich | H04B 7/0417 |
| 2017/0033949 A1* | 2/2017 | Eitan | H04L 25/0204 |

* cited by examiner

SPECTRAL AGGREGATION TO GENERATE A WIDEBAND CHANNEL ESTIMATION

TECHNICAL FIELD

The present description relates generally to channel estimation, including using spectral aggregation to generate a wideband channel estimation.

BACKGROUND

Ranging applications may be utilized to determine a distance from a location/position of one communication device, such as a mobile device, to a location/position of another communication device, such as a base station or wireless access point. In some cases, the distance between the communication devices may be determined based on propagation times of wireless signals transmitted by the communication devices, the accuracy of which may be dependent upon accurate time of arrival estimations (of the wireless signals) at the communication devices.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more implementations, structures and components are shown in block diagram form in order to avoid obscuring the concepts of the subject technology.

The accuracy of time of arrival estimations performed by an electronic device may be limited by the bandwidth of the communication channel associated with the channel estimation that is used by the electronic device to perform the time of arrival estimation. The accuracy may also be impacted by the widened channel impulse response of multi-path communication channels encountered in certain wireless environments, such as indoors. The subject system provides a solution to these problems by aggregating, or stitching, multiple component channel estimations to generate an aggregated wideband channel estimation that can be used by the electronic device to determine more accurate time of arrival estimations than those determinable from the individual component channel estimations.

In order to aggregate the individual component channel estimations to generate the aggregated wideband channel estimation, the subject system compensates for differences in measured channel information between the individual component channel estimations. If these differences are not compensated for in the aggregated wideband channel estimation, the time of arrival estimations obtained by utilizing the aggregated wideband channel estimation may be less accurate. The compensation may involve, e.g., compensation of phase-locked-loop (PLL) phase offsets, which may change from channel to channel with each PLL, and/or compensation for differences in linear phase, which may be caused by detection error variance with each measurement.

Figure 1:
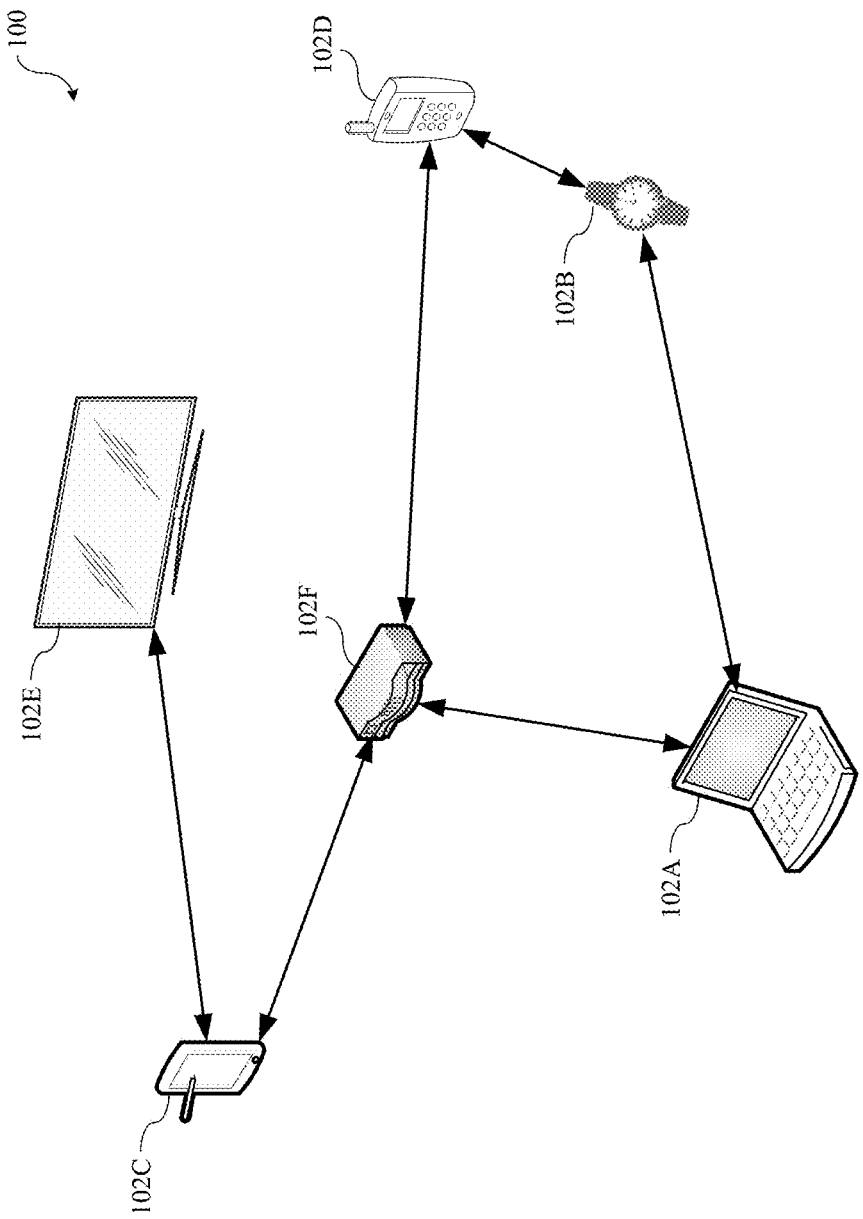
FIG. 1 illustrates an example network environment in which a system for spectral aggregation to generate a wideband channel estimation may be implemented in accordance with one or more implementations.

FIG. 1 illustrates an example network environment 100 in which a system for spectral aggregation to generate a wideband channel estimation may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 100 includes one or more electronic devices 102A-F. The electronic devices 102A-F may be computing devices such as laptop or desktop computers, smartphones, set-top boxes, peripheral devices (e.g., watches, digital cameras, speakers), user input devices, tablets, wireless routers (e.g., Wi-Fi access points), televisions, wearable devices, or other displays with one or more processors coupled thereto and/or embedded therein, or other appropriate devices that include wireless network interfaces, such as wireless local area network (WLAN) radios, Bluetooth radios, and/or other wireless radios.

In FIG. 1, by way of example, the electronic devices 102A, 102B, 102C, 102D, 102E, and 102F are depicted as a laptop computer, a smartwatch, a tablet device, a smartphone, a display device, such as a television, and a wireless router (or access point), respectively. In one or more implementations, the electronic devices 102A-F may be referred to as stations (STAs). One or more of the electronic devices 102A-F may be, and/or may include all or part of, the electronic device discussed below with respect to FIG. 2 and/or the electronic system discussed below with respect to FIG. 8.

One or more of the electronic devices 102A-F may include appropriate wireless network interfaces for establishing direct, e.g. peer-to-peer, wireless network connections, such as Wi-Fi Direct connections, APPLE wireless direct link (AWDL) connections, Bluetooth connections, or generally any wireless network connections that may be used to perform a signal exchange, as well as wireless network connections through an intermediary network device, such as the electronic device 102F (wireless router). In FIG. 1, the network environment 100 is illustrated as including various peer-to-peer connections between example pairs of the electronic devices 102A-F. However, the peer-to-peer connections between the electronic devices 102A-F are not limited to the example pairs of electronic devices 102A-F shown in FIG. 1. In one or more implementations, fewer, more, and/or different electronic devices and/or peer-to-peer connections may be utilized in the network environment 100.

In one or more implementations, two or more of the electronic devices 102A-F of the network environment 100, such as the electronic devices 102A-B, may exchange signals with one another to perform one or more ranging operations, such as to determine (or estimate) the distance (e.g., line of sight distance) between the electronic devices 102A-B. Example signal exchanges, such as to perform ranging operations, are discussed further below with respect to FIGS. 3 and 4.

The line of sight distance estimation obtained from the one or more ranging operations may be used by one or more of the electronic devices 102A-B, for example, to determine whether to perform one or more tasks. In one or more implementations, the electronic device 102A (laptop computer) may unlock an operating system running on the electronic device 102A when the electronic device 102A estimates (using the subject system) that the electronic device 102B (smartwatch) is within a threshold distance of the electronic device 102A, such as 20 centimeters. In one or more implementations, any of the electronic devices 102A-F may utilize the subject system for indoor positioning, such as by utilizing the electronic device 102F (wireless router) to determine a location/position of one of the electronic devices 102A-E relative to the electronic device 102F, e.g., in an indoor environment. In one or more implementations, an indoor location of, for example, the electronic device 102B (smartwatch) may be obtained using triangulation by estimating (using the subject system) a distance from two or more static stations, such as the electronic device 102F (wireless router) and another static station, to a dynamic station, such as the electronic device 102B. In one or more implementations, the electronic device 102C (tablet device) may present an option to display content on the electronic device 102E (display device) when the electronic device 102C estimates (using the subject system) that the electronic device 102E is within a threshold distance of the electronic device 102C, such as 3 meters.

The accuracy of the distance estimation between any two of the electronic devices 102A-F, such as the electronic devices 102A-B, may be dependent on an accurate time of arrival estimation of a signal received by one or more of the electronic devices 102A-B, as is discussed further below with respect to FIG. 3. In one or more implementations, the time of arrival estimation may be determined using a channel estimation of a communication channel utilized by the electronic devices 102A-B, and the accuracy of the time of arrival estimation may be dependent upon the bandwidth of the communication channel.

For example, the accuracy of the time of arrival estimation and the distance estimation may increase as the bandwidth of the channel estimation increases. In one or more implementations, when using a channel estimation to determine the time of arrival estimation, the distance between the electronic devices 102A-B may be estimated within an error margin of approximately c/BW, where c is the speed of light and BW is the bandwidth of the channel estimation. Thus, when using a channel estimation of a 20 Megahertz (MHz) WLAN channel, the error margin of the distance estimation may be approximately 15 meters. Accordingly, the bandwidth of an individual 1 MHz Bluetooth channel, or an individual 20 MHz WLAN channel, may not provide for a channel estimation from which a time of arrival can be estimated with sufficient accuracy to determine whether the electronic device 102B is within the aforementioned threshold distance (e.g., 20 cm) of the electronic device 102A.

In the subject system, the electronic devices 102A-B generate multiple individual component channel estimations for multiple different component channels, such as multiple 1 MHz Bluetooth channels and/or multiple 20 MHz WLAN channels, and aggregate the individual component channel estimations to form an aggregated wideband channel estimation having an aggregate bandwidth that exceeds the bandwidth of any of the individual component channel estimations. The individual component channel estimations may be narrowband channel estimations, e.g., relative to the aggregated wideband channel estimation. Any number of component channel estimations may be aggregated into the aggregated wideband channel estimation; however, widening the bandwidth of the aggregated wideband channel estimation, such as by aggregating additional component channel estimations into the aggregated wideband channel estimation, may improve the accuracy of the time of arrival and distance estimations. An example process for generating an aggregated wideband channel estimation from multiple individual component channel estimations is discussed further below with respect to FIG. 5.

In one or more implementations, the component channels used to form the aggregated wideband channel estimation may include, for example, one or more Bluetooth channels (e.g., 1 MHz channels), one or more Wi-Fi channels (e.g., 20, 40, 80, 160 MHz channels), one or more Zigbee channels (e.g., 2 MHz channels), one or more millimeter wave (e.g., 60 Gigahertz (GHz)) channels, or generally any communication channels. Thus, the aggregated wideband channel estimation may be formed from component channels of a single communication protocol or multiple different communication protocols (e.g., Wi-Fi, Bluetooth, Zigbee, etc.). In one or more implementations, two or more of the component channels utilized to form the aggregated wideband channel estimation may be contiguous, overlapping, and/or non-adjacent. An example aggregated wideband channel estimation using non-overlapping channel estimations is discussed further below with respect to FIG. 6, and an example aggregated wideband channel estimation using overlapping channel estimations is discussed further below with respect to FIG. 7.

The wider bandwidth associated with the aggregated wideband channel estimation (relative to the bandwidth of the individual component channel estimations) may allow the electronic devices 102A-B to perform time of arrival estimations and, thus, line of sight (or first reflection) distance estimations in any of the component channels with higher accuracy than can be performed from any one of the component channel estimations that form the aggregated wideband channel estimation. For example, the aggregated wideband channel estimation may allow the electronic devices 102A-B to perform time of arrival estimations that are sufficiently accurate to estimate the line of sight distance between the electronic devices 102A-B, such as to determine whether the electronic device 102B is within the aforementioned threshold distance (e.g., 20 cm) of the electronic device 102A. With the higher accuracy associated with the aggregated wideband channel estimation, the subject system can distinguish between the first reflection of a signal and other reflections of the signal, e.g., for a multi-path channel, the signal may arrive via one or more non-line of sight paths in addition to a line of sight path.

In one or more implementations, in order to combine the individual component channel estimations to form the aggregated wideband channel estimation, the electronic devices 102A-B may compensate for various operating characteristics and/or other variations that may differ from channel to channel and therefore may impact the individual component channel estimations differently. For example, the clocks of the electronic devices 102A-B may not be synchronized and the electronic devices 102A-B (e.g., components of the electronic devices 102A-B) may be associated with a respective internal delay that may differ from channel to channel. The clock offset(s) and the internal delay(s) associated with the electronic devices 102A-B, as well as differences in PLL offsets and/or linear phase (which may be caused by detection error variance) across channels, may impact the channel estimations differently and therefore may impact the aggregated wideband channel estimation if not compensated for across the individual component channel estimations.

In the subject system, the clock offset(s) between the electronic devices 102A-B, the internal delay(s) associated with the electronic devices 102A-B, and/or the differences in PLL offsets or linear phase across channels, may be calibrated and compensated for by the electronic devices 102A-B across the different channels. Thus, these effects can be compensated for across the different channels such that the effects do not adversely affect an aggregated wideband channel estimation generated by the electronic devices 102A-B, thereby improving the accuracy of the time of arrival estimations determined from the aggregated wideband channel estimation (e.g., relative to a case in which one or more of the effects are not compensated for).

Figure 2:
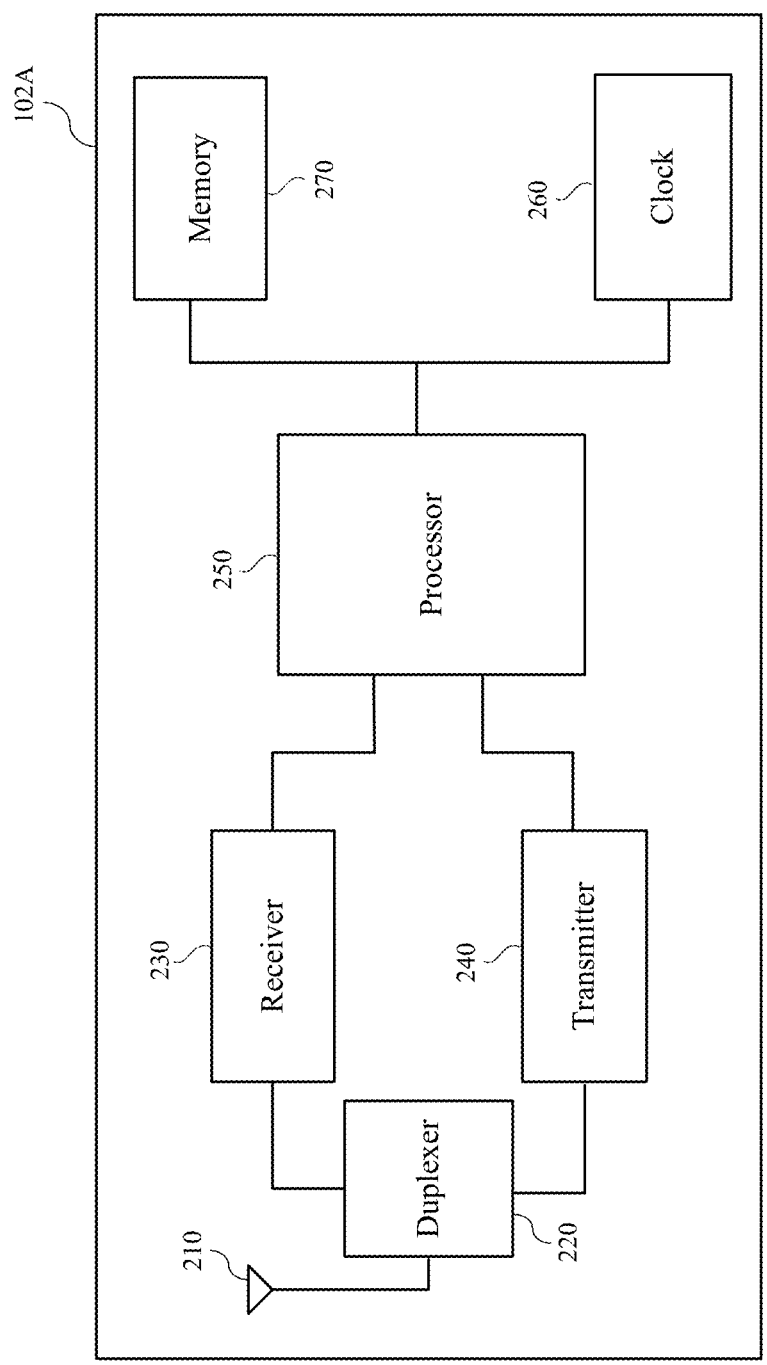
FIG. 2 illustrates an example electronic device that may be utilized in a system for spectral aggregation to generate a wideband channel estimation in accordance with one or more implementations.

FIG. 2 illustrates an example electronic device 102A that may be utilized in a system for spectral aggregation to generate a wideband channel estimation may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided. In one or more implementations, one or more components of the example electronic device 102A may be implemented by one or more of the other electronic devices 102B-F.

The electronic device 102A includes a radio frequency (RF) antenna 210, a duplexer circuit 220, a receiver circuit 230, a transmitter circuit 240, a processing circuit 250, a clock circuit 260, and a memory 270. In one or more implementations, one or more of the components represented in FIG. 2 may be integrated on one or more semiconductor substrates. For example, any/all of the receiver circuit 230, transmitter circuit 240, processing circuit 250, clock circuit 260, and/or memory 270 may be realized in a single chip or a single system on chip, or may be realized in a multi-chip chipset.

The RF antenna 210 may be suitable for transmitting and/or receiving signals (e.g., wireless signals) over a range of frequencies (e.g., 800 MHz, 900 MHz, 1.7 GHz, 2.1 GHz, 2.4 GHz, 2.6 GHz, 5 GHz, 60 GHz, etc.). Although a single RF antenna 210 is illustrated, additional RF antennas may be utilized. The duplexer circuit 220 may provide isolation in a transmit band to facilitate avoiding saturation of the receiver circuit 230 and/or facilitate avoiding damaging parts of the receiver circuit 230.

The receiver circuit 230 may include suitable logic circuitry and/or code that may be operable to receive and process signals from the RF antenna 210. The receiver circuit 230 may, for example, be operable to amplify and/or down-convert received wireless signals. In some aspects, the receiver circuit 230 may be operable to cancel noise in received signals and/or may be linear over a wide range of frequencies. The receiver circuit 230 may be suitable to allow receipt of signals in accordance with a variety of wireless standards, such as to participate in one or more of the signal exchanges discussed further below with respect to FIGS. 3 and 4.

The transmitter circuit 240 may include suitable logic circuitry and/or code that may be operable to process and transmit signals to the RF antenna 210. The transmitter circuit 240 may, for example, be operable to up-convert baseband signals to RF signals and amplify RF signals. The transmitter circuit 240 may be suitable to allow transmission of signals in accordance with a variety of wireless standards, such as to participate in one or more of the signal exchanges discussed further below with respect to FIGS. 3 and 4.

In one or more implementations, the processing circuit 250 may be, may include, or may be a part of, a baseband processing circuit or a digital processing circuit. The processing circuit 250 may include suitable logic, circuitry, interfaces, and/or code that may be operable to perform processing of signals, such as baseband signals. The processing circuit 250 may, for example, generate control and/or feedback signals for configuring various components of the electronic device 102A, such as the receiver circuit 230 and the transmitter circuit 240. In this regard, the processing circuit 250 may receive signals from and provide signals to the receiver circuit 230 and the transmitter circuit 240 (e.g., to change channels for purposes of generating multiple individual component channel estimations).

In one or more implementations, the processing circuit 250 may be operable to encode, decode, transcode, modulate, demodulate, encrypt, decrypt, scramble, descramble, and/or otherwise process data in accordance with one or more communication protocols. In one or more implementations, the processing circuit 250 may retrieve (e.g., from the memory 270) and execute instructions to generate component channel estimations, store the generated component channel estimations in the memory 270, aggregate the component channel estimations into an aggregated wideband channel estimation, and generate ranging estimations (e.g., time of arrival estimations, line of sight distance estimations) using the aggregated wideband channel estimation.

The processing circuit 250 may also include suitable logic, circuitry, and/or code that enable processing data and/or controlling operations of the electronic device 102A. In this regard, the processing circuit 250 may be enabled to provide control signals to various other components of the electronic device 102A. The processing circuit 250 may also control transfers of data between various portions of the electronic device 102A. Additionally, the processing circuit 250 may enable implementation of an operating system or otherwise execute code to manage operations of the electronic device 102A.

The clock circuit 260 may include suitable logic, circuitry, interfaces, and/or code that are operable to generate a reference clock signal (e.g., a master clock signal). The reference clock signal may be used to synchronize and schedule operations performed by the various components of the electronic device 102A. The clock circuit 260 may also generate one or more oscillating signals of one or more frequencies, e.g. based on the reference clock signal. The oscillating signals may be referred to as local oscillator (LO) signals. In one or more implementations, the clock circuit 260 may include one or more PLLs to detect and/or compensate for any drift in frequency in the LO signals. In some cases, the same PLL(s) may be used for transmitting and receiving. In other cases, different PLL(s) may be used for transmitting and receiving.

The memory 270 may include suitable logic, circuitry, and/or code that enable storage of various types of information such as received data, generated data, code, and/or configuration information. The memory 270 may include, for example, RAM, ROM, flash, and/or magnetic storage. Information stored in the memory 270 may be utilized for configuring the receiver circuit 230, transmitter circuit 240, processing circuit 250, and/or clock circuit 260. The memory 270 may store instructions retrievable and executable by the processing circuit 250 to facilitate spectral aggregation to generate a wideband channel estimation.

In one or more implementations, one or more of the duplexer circuit 220, receiver circuit 230, transmitter circuit 240, processing circuit 250, clock circuit 260, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
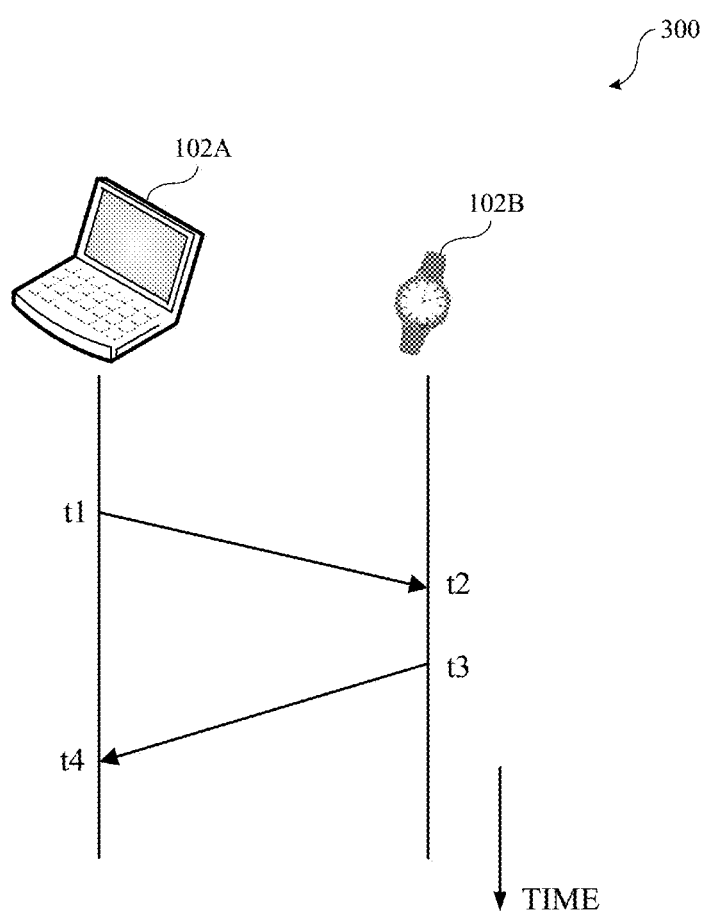
FIG. 3 illustrates an example timing diagram of an example signal exchange between two electronic devices to estimate a time of flight in accordance with one or more implementations.

FIG. 3 illustrates an example timing diagram 300 of an example signal exchange, such as a packet exchange, between the electronic device 102A and the electronic device 102B to estimate a time of flight in accordance with one or more implementations. The time of flight estimate may in turn be utilized to estimate a distance between the electronic device 102A and the electronic device 102B. For explanatory purposes, the example signal exchange is described herein with reference to the electronic devices 102A-B of the example network environment 100 of FIG. 1; however, the signal exchange is not limited to the electronic devices 102A-B of the example network environment 100 of FIG. 1. In general, the time of flight estimation may be utilized to estimate a distance between any two objects that have a respective radio device included and/or attached to them.

The time of flight may refer to the time it takes for a signal (e.g., a radio wave carried message) to propagate from a transmitting station, such as the electronic device 102A for the signal transmitted at $t_1$, to a receiving station, such as the electronic device 102B for the signal received at $t_2$. The distance between the transmitting station and the receiving station may be utilized for a ranging estimation based on the following relation: distance=c×TOF, where distance is the distance between the transmitting and the receiving station at a point in time, TOF is the time it takes for the signal to propagate between the transmitting station and the receiving station, and c is the speed of light ($3\times10^8$ m/s).

In one or more implementations, a time of flight estimation based on the signal exchange depicted in FIG. 3 may be dependent on the signal exchange being performed in a reciprocal channel. A channel may be reciprocal when the channel response experienced by a signal propagating from a first station (e.g., the electronic device 102A) to a second station (e.g., the electronic device 102B) is the same as the channel response experienced by a signal propagating from the second station to the first station. For example, a channel, which may be a multi-path channel, between any the electronic devices 102A-B can be reciprocal up to in-station filters, which can be calibrated and/or compensated for by the electronic devices 102A-B.

In FIG. 3, the electronic device 102A transmits a first signal (e.g., a first packet) to the electronic device 102B at a time $t_1$ and the electronic device 102B receives the first signal from the electronic device 102A at a time $t_2$. The electronic device 102B then transmits a second signal (e.g., a second packet) to the electronic device 102A at a time $t_3$ and the electronic device 102A receives the second signal at a time $t_4$. In the case that the channel between the electronic device 102A and the electronic device 102B is, or can be considered to be, reciprocal, the time of flight may be provided by the following relation:

$$TOF = t_2 - t_1 = t_4 - t_3 = \frac{(t_2 - t_1) + (t_4 - t_3)}{2} = \frac{(t_4 - t_1) + (t_3 - t_2)}{2}$$

Since the time difference $t_4-t_1$ is associated only with the electronic device 102A (e.g., transmission time and reception time at the electronic device 102A) and the time difference $t_3-t_2$ is associated only with the electronic device 102B, the electronic devices 102A-B need not be synchronized in time in order to perform the time of flight estimation. In determining the time of flight, the transmit times $t_1$ and $t_3$ are known by the transmitting devices, since the electronic devices 102A-B know the respective times at which they transmitted their respective signal. Thus, the time of flight estimation involves time of arrival estimations of the receive times $t_2$ and $t_4$ by the electronic devices 102A-B. In general, the time of arrival estimation may provide an estimation of a station's detection error, also referred to as detection delay.

Although the signal exchange between the electronic devices 102A-B in FIG. 3 is performed for a single channel, in one or more implementations, the signal exchange may be performed across multiple channels, e.g. in parallel, and/or across multiple communication protocols, such as Wi-Fi, Bluetooth, Zigbee, etc., to obtain multiple estimates. For example, the electronic device 102A can transmit Packet1 on a first channel via a first communication protocol, transmit Packet1 on a second channel via a second communication protocol that differs from the first communication protocol, transmit Packet1 on a third channel via the first communication protocol, and then receive Packet2 on the first channel via the first communication protocol, receive Packet2 on the second channel via the second communication protocol, and receive Packet2 on the third channel via the first communication protocol.

Figure 4:
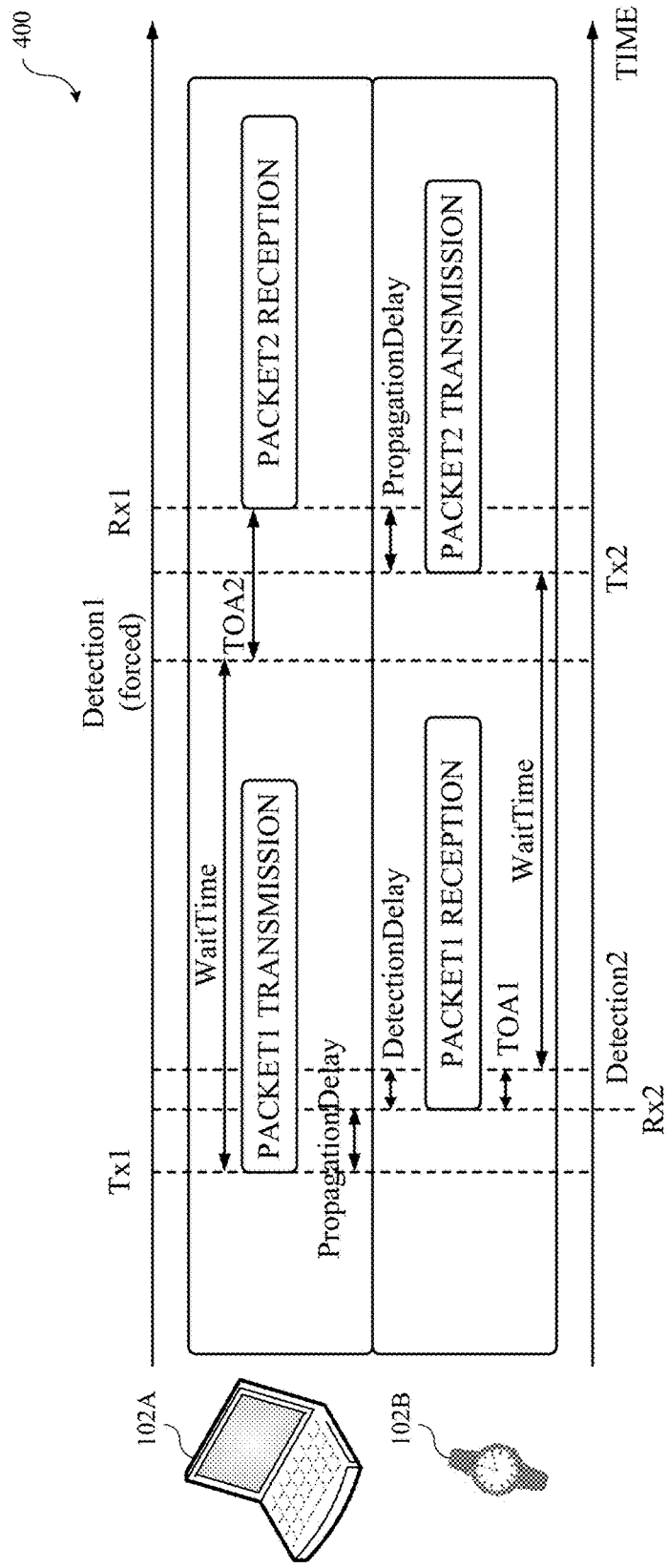
FIG. 4 illustrates an example timing diagram of an example signal exchange between two electronic devices in a system for spectral aggregation to generate a wideband channel estimation in accordance with one or more implementations.

FIG. 4 illustrates an example timing diagram 400 for an example signal exchange, such as a packet exchange, in a reciprocal channel between an initiating electronic device and a responding electronic device in a system for spectral aggregation to generate a wideband channel estimation in accordance with one or more implementations. An overview of the timing diagram 400 is provided below, and the timing diagram 400 is discussed in more detail further below with respect to FIG. 5.

As shown in FIG. 4, the signal exchange begins with the initiating electronic device, such as the electronic device 102A, initiating the transmission of a first signal, such as a first packet, to the responding electronic device, such as the electronic device 102B, at a time denoted as Tx1. After an amount of time corresponding to both a PropagationDelay and a DetectionDelay elapses from Tx1, the electronic device 102B detects the reception of the packet at a time denoted as Detection2 and then receives the packet.

After an amount of time (WaitTime) elapses from Tx1, the electronic device 102A opens a receive window for a second packet to be transmitted by the electronic device 102B. The electronic device 102B transmits the second packet at a time denoted as Tx2 after the amount of time (WaitTime) elapses from Detection2. After the PropagationDelay elapses from Tx2, the electronic device 102A begins to receive the second packet at a time denoted as Rx1. The electronic devices 102A-B may then use the received packets to perform channel estimations as is discussed further below with respect to FIG. 5. An exchange of packets in the manner shown in FIG. 4 allows for the synchronization of the detection delays of the electronic devices 102A-B in the channel, which in turn allows the time of arrival estimates at the electronic devices 102A-B to be determined independent of the respective detection delays, and thereby effectively eliminates the effect of detection error variances.

Figure 5:
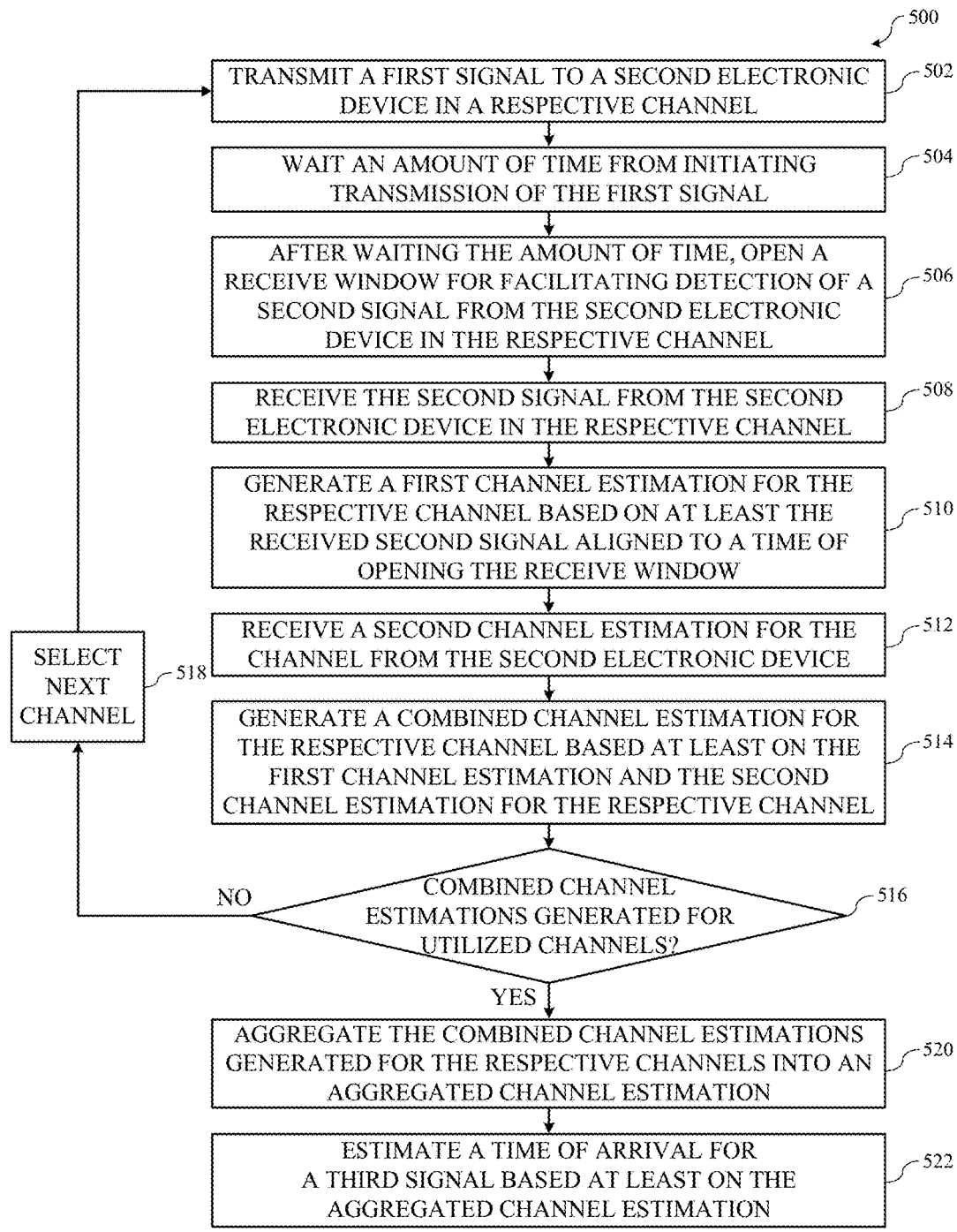
FIG. 5 illustrates a flow diagram of an example process of an initiating electronic device in a system for spectral aggregation to generate a wideband channel estimation in accordance with one or more implementations.

FIG. 5 illustrates a flow diagram of an example process 500 of an initiating electronic device, such as the electronic device 102A, in a system for spectral aggregation to generate a wideband channel estimation in accordance with one or more implementations. For explanatory purposes, the example process 500 is primarily described herein with reference to the electronic devices 102A-B of the network environment 100 of FIG. 1 and the example signal exchange illustrated in FIG. 4. However, the example process 500 is not limited to the electronic devices 102A-B or the example signal exchange of FIG. 4, and one or more blocks (or operations) of the example process 500 may be performed by one or more components of the electronic devices 102A-B. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

The electronic device 102A transmits a first packet (Packet1) to the electronic device 102B in a channel (502). As shown in FIG. 4, the signal exchange is initiated with the electronic device 102A transmitting the first packet to the electronic device 102B at Tx1. The first packet may propagate through the channel between the electronic devices 102A-B and arrive at the electronic device 102B at Rx2, which occurs after the PropagationDelay elapses from Tx1. The electronic device 102B may detect the first packet at Detection2. In FIG. 4, the DetectionDelay may be utilized to denote a time difference between the first packet reaching the electronic device 102B (at Rx2) and the first packet being detected by the electronic device 102B (at Detection2).

After an amount of time (WaitTime) elapses from the electronic device 102B detecting the first signal at Detection2, the electronic device 102B may transmit a second packet (Packet2) to the electronic device 102A. The amount of time may be a predetermined amount of time that is agreed upon by the electronic devices 102A-B, e.g., prior to initiating the signal exchange shown in FIG. 4, and/or an amount of time that is pre-configured or pre-stored in the electronic devices 102A-B. As shown in FIG. 4, the electronic device 102B transmits the second packet at Tx2, which occurs after the WaitTime elapses from Detection2.

The electronic device 102A waits an amount of time (WaitTime) from initiating transmission of the first signal (504). After the amount of time elapses from initiating transmission of the first signal, the electronic device 102A opens a receive window (or inspection window) for facilitating detection of the second packet from the electronic device 102B in the channel (506). In one or more implementations, the electronic device 102A may perform a coarse detection of the second packet in order to set the receive window, and may search for (e.g., estimate) a time of arrival within the receive window.

In one or more implementations, the electronic device 102A may place/open the receive window at Deteton1, which occurs after the WaitTime elapses from Tx1, and the electronic device 102A may generate the first channel estimation at Detection1. The opening of the receive window allows the electronic device 102A to detect the second packet when the second packet arrives at the electronic device 102A, with a detection delay that is equal to minus the DetectionDelay associated with the detection of the first packet by the electronic device 102B. In one or more implementations, the electronic device 102A may place/open the receive window and generate the first channel estimation based on the detection of the second packet aligned to the actual detection time, and may then use signal post-processing (e.g., applying a linear phase) based on a time difference between the actual detection time and the time Deteton1 to align the second packet to Deteton1 at which the receive window is opened. Whether by placing/opening the receive window at Deteton1 or post-processing to align the second packet to Deteton1, a combination of the detection delays associated with the first packet and the second packet effectively cancels out the detection delays when the packets are combined to form a joint signal and thereby creates an effective detection error equal to zero for the joint signal.

The electronic device 102A receives the second packet from the electronic device 102B in the channel (508). As shown in FIG. 4, the electronic device 102A may begin to receive the second packet at Rx1, which occurs after the PropagationDelay elapses from the start of the transmission of the second packet by the electronic device 102B at Tx2. Thus, the PropagationDelay associated with transmitting the first packet from the electronic device 102A to the electronic device 102B, is the same as the PropagationDelay associated with transmitting the second packet from the electronic device 102B to the electronic device 102A (e.g., in a reciprocal channel). In some cases, such as in indoor applications, the PropagationDelay may be, or may be referred to as, a multi-path channel propagation delay.

The exchange of packets shown in FIG. 4 allows for synchronization of the detection delay for both of the electronic devices 102A-B in the channel by causing the following relation: TOA1+TOA2=2×PropagationDelay, which is effectively independent of the detection delays at the electronic devices 102A-B and thereby effectively eliminates the effect of detection error variances. Thus, in one or more implementations, the detection delay does not need to be estimated as part of the time of arrival estimation. In the relation, the time of arrival associated with the electronic device 102A is denoted as TOA1 and the time of arrival associated with the electronic device 102B is denoted as TOA2. The time of arrival TOA1 is the time between the detection time Detection2 of the first packet by the electronic device 102B and the actual receipt time Rx2 of the first packet by the electronic device 102B. The time of arrival TOA2 is the time between the time Detection1 at which the electronic device 102A opens its receive window for facilitating detection of the second packet by the electronic device 102A and the actual receipt time Rx1 of the second packet by the electronic device 102A.

The relation can be obtained as provided below. With reference to FIG. 4, the following relationships can be provided:

$$Rx2 = Tx1 + PropagationDelay$$

$$Detection2 = Rx2 + DetectionDelay$$

$$Tx2 = Detection2 + WaitTime$$

$$Rx1 = Tx2 + PropagationDelay$$

$$Detection1 = Tx1 + WaitTime$$

TOA1 and TOA2 can be provided as follows:

$$\begin{aligned}
TOA1 &= Rx2 - Detection2 \\
&= Tx2 + PropagationDelay - Tx1 - WaitTime \\
&= Tx1 + PropagationDelay - Rx2 + DetectionDelay \\
&= Tx1 + PropagationDelay - Tx1 - PropagationDelay + \\
&\quad DetectionDelay \\
&= DetectionDelay
\end{aligned}$$

$$\begin{aligned}
TOA2 &= Rx1 - Detection1 \\
&= Tx2 + PropagationDelay - Tx1 - WaitTime \\
&= Detection2 + WaitTime + PropagationDelay - \\
&\quad Tx1 - WaitTime \\
&= Rx2 - DetectionDelay + PropagationDelay - Tx1 \\
&= Tx1 + PropagationDelay - DetectionDelay + \\
&\quad PropagationDelay - Tx1 \\
&= 2 \times PropagationDelay - DetectionDelay
\end{aligned}$$

Accordingly, the aforementioned relation can be obtained from the sum of TOA1 and TOA2, in which the sum of TOA1 and TOA2 is independent of DetectionDelay.

$$\begin{aligned}
TOA1 + TOA2 &= DetectionDelay + 2 \times PropagationDelay - \\
&\quad DetectionDelay \\
&= 2 \times PropagationDelay
\end{aligned}$$

The electronic device 102A generates a first channel estimation for the channel based at least on the received second packet aligned to a time of opening the receive window (510). The electronic device 102A may analyze the signal it records and generate the first channel estimation. In one or more implementations, the channel estimation may be a frequency domain channel estimation performed using a fast Fourier transform (FFT). The electronic device 102A may generate a frequency domain channel estimation, denoted as ChEst1 [f], based on the following relation:

$$ChEst1[f] = \frac{FFT(x(t))}{FFT(Ref(t))} = \frac{X(f)}{Ref(f)}$$

where x(t) is the received signal in the time domain and Ref(t) is a known reference signal in the time domain. With reference to FIG. 4, x(t) is the second packet received by the electronic device 102A.

A similar relation to that of ChEst1[f] can be provided for a frequency domain channel estimation ChEst2[f] generated by the electronic device 102B, with the signal x(t) received by the electronic device 102B being the first packet in FIG. 4. In this regard, the electronic device 102B may generate a second channel estimation for the channel based at least on the received first packet aligned to a time of detection of the first packet by the electronic device 102B. For example, the electronic device 102B may align the received first packet to the actual detection time Detection2 of the first packet by the electronic device 102B. The electronic device 102B may transmit the second channel estimation to the electronic device 102A, and the electronic device 102A may receive the second channel estimation (512).

The electronic device 102A generates a combined channel estimation, denoted as CC1[f], for the channel based at least on the first channel estimation ChEst1[f] for the channel and the second channel estimation ChEst2[f] for the channel received from the electronic device 102B (514). The amplitude of CC1[f], denoted as Amplitude (CC1[f])) may be an amplitude of the ChEst1[f], ChEst2[f], or combination thereof. The phase of CC1[f], denoted as Phase(CC1[f])), may be, or may be directly proportional to, an average phase of the ChEst1[f] and ChEst2[f], and may be independent of the detection delay.

In one or more implementations, Phase(CC1[f])) may be affected by PLL phase offsets associated with the electronic devices 102A-B. In this regard, the PLL phase offset that the electronic device 102A experiences, denoted as PLLoffset1, can be provided by PLLoffset1=Phase (TxPLL2)−Phase (RxPLL1), where TxPLL2 and RxPLL1 denote the PLL phase offset associated with the transmitter of the electronic device 102B and the PLL phase offset associated with the receiver of the electronic device 102A, respectively. The PLL phase offset that the electronic device 102B experiences, denoted as PLLoffset2, can be provided by PLLoffset2=Phase(TxPLL1)−Phase(RxPLL2), where TxPLL1 and RxPLL2 denote the PLL phase offset associated with the transmitter of the electronic device 102A and the PLL phase offset associated with the receiver of the electronic device 102B, respectively.

In one or more implementations when the electronic device 102A uses the same PLL for receiving and transmitting and the electronic device 102B uses the same PLL for receiving and transmitting, the effect of the PLL phase offsets can be removed, such that the phase of CC1[f] is independent of the PLL phase offsets. For example, a single PLL in each of the electronic devices 102A-B may generate transmit and receive local oscillators (LOs). In such a case, Phase(TxPLL1)=Phase(RxPLL1) and Phase(TxPLL2)=Phase(RxPLL2). Accordingly, the following relation can be provided between PLLoffset1 and PLLoffset2:

$$PLL_{offset1} = \text{Phase}(TxPLL2) - \text{Phase}(RxPLL1)$$
$$= \text{Phase}(RxPLL2) - \text{Phase}(TxPLL1)$$
$$= -(\text{Phase}(TxPLL1) - \text{Phase}(RxPLL2))$$
$$= -PLL_{offset2}$$

The phase of the frequency domain channel estimation for the electronic device 102A and the electronic device 102B can be provided by:

$$\text{Phase}(ChEst1[f]) = PLL_{offset1} + \text{Phase}(TOA1)$$
$$\text{Phase}(ChEst2[f]) = PLL_{offset2} + \text{Phase}(TOA2)$$
$$= -PLL_{offset1} + \text{Phase}(TOA2)$$

In some cases, the Phase(TOA1) and Phase(TOA2) denote a linear phase of TOA1 and TOA2, respectively.

The phase of the combined channel estimation can be provided by:

$$\text{Phase}(CC[f]) = \frac{\text{Phase}(ChEst1[f]) + \text{Phase}(ChEst2[f])}{2} +$$
$$\text{Phase}(MultipathChannel)$$
$$= \frac{\text{Phase}(TOA1) + \text{Phase}(TOA2)}{2} + \text{Phase}(MultipathChannel)$$
$$= \frac{2 \times \text{Phase}(PropagationDelay)}{2} +$$
$$\text{Phase}(MultipathChannel)$$
$$= \text{Phase}(PropagationDelay) + \text{Phase}(MultipathChannel)$$

Thus, the combined channel estimation is independent of the PLL offset of the electronic devices 102A-B and the detection delay. The multi-path channel between the electronic devices 102A-B can be reciprocal, e.g. up to in-station filters. The multi-path channel (e.g., Phase(MultipathChannel)) can generally be calibrated and compensated for.

In one or more implementations, the transmit PLL and the receive PLL may be different for one or both of the electronic devices 102A-B. In these case, generally, Phase(TxPLL1)≠Phase(RxPLL1) and/or Phase(TxPLL2)≠Phase(RxPLL2). Overlapping channels may be utilized to compensate for PLL phase differences for each channel. The PLL phase difference can be estimated for overlapping channels:

$$\text{Phase}(CC1[i]) - \text{Phase}CC2[j] = PLL_{offset1} - PLL_{offset2}$$

where CC1 is a combined channel estimation of a first channel, CC2 is a combined channel estimation of a second channel that overlaps the first channel, and i and j are indexes that point to the same frequency. The PLL phase difference may be easier to compensate for in a case that the phase of the time of arrival is independent of the detection delay.

The electronic device 102A determines whether combined channel estimations have been generated for the channels that will be utilized to form the aggregated wideband channel estimation (516). When the electronic device 102A determines that a combined channel estimation has not been generated for a utilized channel, the electronic device 102A selects a next channel (518) and repeats (502)-(514) for the next channel. In this regard, the exchange of packets and the frequency domain channel estimation may be performed in one or more additional channels to generate one or more additional combined channel estimations.

In one or more implementations, transitioning from one channel to another channel may be physical layer (PHY) driven and/or may utilize one or more higher communication layers. In one or more implementations, the amount of time associated with the signal exchange illustrated in FIG. 4 and generation of combined channel estimations may be dependent on the communication protocol(s) (e.g., Bluetooth, Wi-Fi, and/or other wireless communication protocol) and processing power of the electronic devices 102A-B. The amount of time may be dependent on whether or not transitioning from one channel to another channel is exclusively PHY driven or involves higher communication layers. In one or more implementations, in a Wi-Fi-based system that is exclusively PHY driven, the amount of time associated with the signal exchange illustrated in FIG. 4 and generation of a combined channel estimation for a channel may be on the order of a millisecond.

When the electronic device 102A determines that a combined channel estimation has been generated for each of the utilized channels (516), the electronic device 102A aggregates the combined channel estimation generated for each channel into an aggregated wideband channel estimation (520), such as the aggregated wideband channel estimations that are discussed further below with respect to FIGS. 6 and 7. In one or more implementations, the aggregated wideband channel estimation may effectively be a wideband channel estimation.

After generating the aggregated wideband channel estimation (520), the electronic device 102A may estimate a time of arrival for a third signal based at least on the aggregated wideband channel estimation (522). The third signal may be transmitted by the electronic device 102B to the electronic device 102A, for example, as part of the signal exchange described above with respect to FIG. 3. In one or more implementations, an inverse fast Fourier transform (IFFT) may be applied to find the first reflection and determine the time of arrival estimation for the third signal. In one or more implementations, one or more other methods, such as super resolution methods (e.g., multiple signal classification (MUSIC), matrix pencil (MP), etc.), may be utilized to find the first reflection and determine the time of arrival estimation for the third signal. As described above with respect to FIG. 3, the electronic device 102A may utilize a known transmission time of a signal transmitted to the electronic device 102B, and the time of arrival estimation, to determine a time of flight. The time of flight may then be used to estimate the line of sight distance between the electronic devices 102A-B, e.g., using the aforementioned relation: distance=c×TOF.

Although the foregoing describes using the aggregated wideband channel estimation to determine the time of arrival estimation and the first reflection, in one or more implementations, the aggregated wideband channel estimation may be utilized for determining other parameters and/or for performing other operations. For example, in ranging applications, the aggregated wideband channel estimation may be utilized to estimate a direction of arrival, such as in cases where antenna arrays, such as phased arrays, are utilized for the transmission and/or reception of signals.

Furthermore, although the foregoing describes the signal exchange occurring across multiple channels in serial, in one or more implementations, the signal exchange can be performed across two or more of the channels in parallel. For example, the electronic device 102A can transmit Packet1 on a first channel, transmit Packet1 on a second channel, transmit Packet1 on a third channel, and then receive Packet2 on the first channel, receive Packet2 on the second channel, and receive Packet2 on the third channel.

Figure 6:
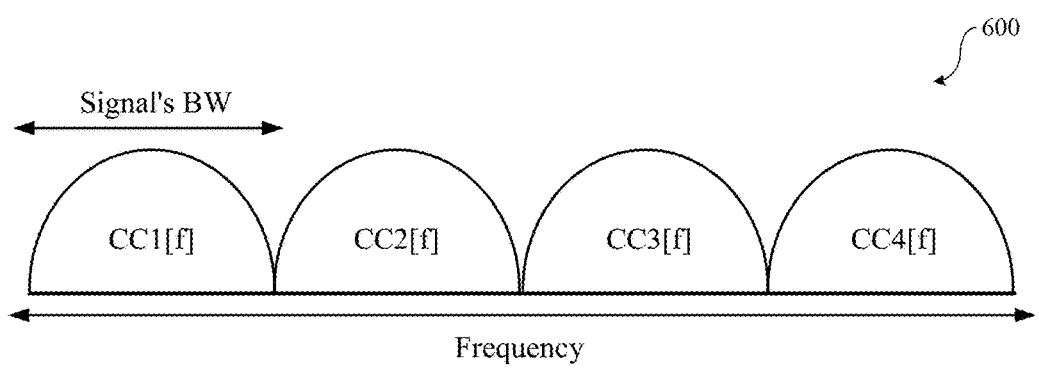
FIG. 6 illustrates an example aggregated wideband channel estimation with non-overlapping channels in accordance with one or more implementations.

FIG. 6 illustrates an example aggregated wideband channel estimation 600 with non-overlapping channels in accordance with one or more implementations. As shown in FIG. 6, the example aggregated wideband channel estimation 600 is formed from multiple individual non-overlapping component channel estimations that span a frequency band. Although the individual non-overlapping component channel estimations are illustrated in FIG. 6 as being contiguous, two or more of the non-overlapping component channel estimations may also be non-contiguous.

Figure 7:
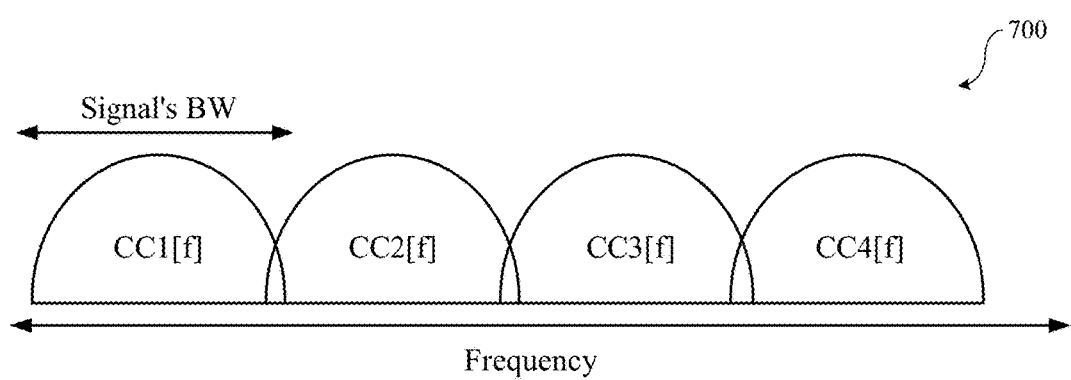
FIG. 7 illustrates an example aggregated wideband channel estimation with overlapping channels in accordance with one or more implementations.

FIG. 7 illustrates an example aggregated wideband channel estimation 700 with overlapping channels in accordance with one or more implementations. As shown in FIG. 7, the example aggregated wideband channel estimation 700 is formed from multiple individual (at least partially) overlapping component channel estimations that span a frequency band. The aggregated wideband channel estimation 700 may be formed from the overlapping component channel estimations when different PLLs are used for reception and transmission. The use of different PLLs for reception and transmission may cause the PLL offsets to be different for each station. In some other implementations, two or more of the channels used may be at least partially overlapping and one or more other channels may be non-overlapping.

Figure 8:
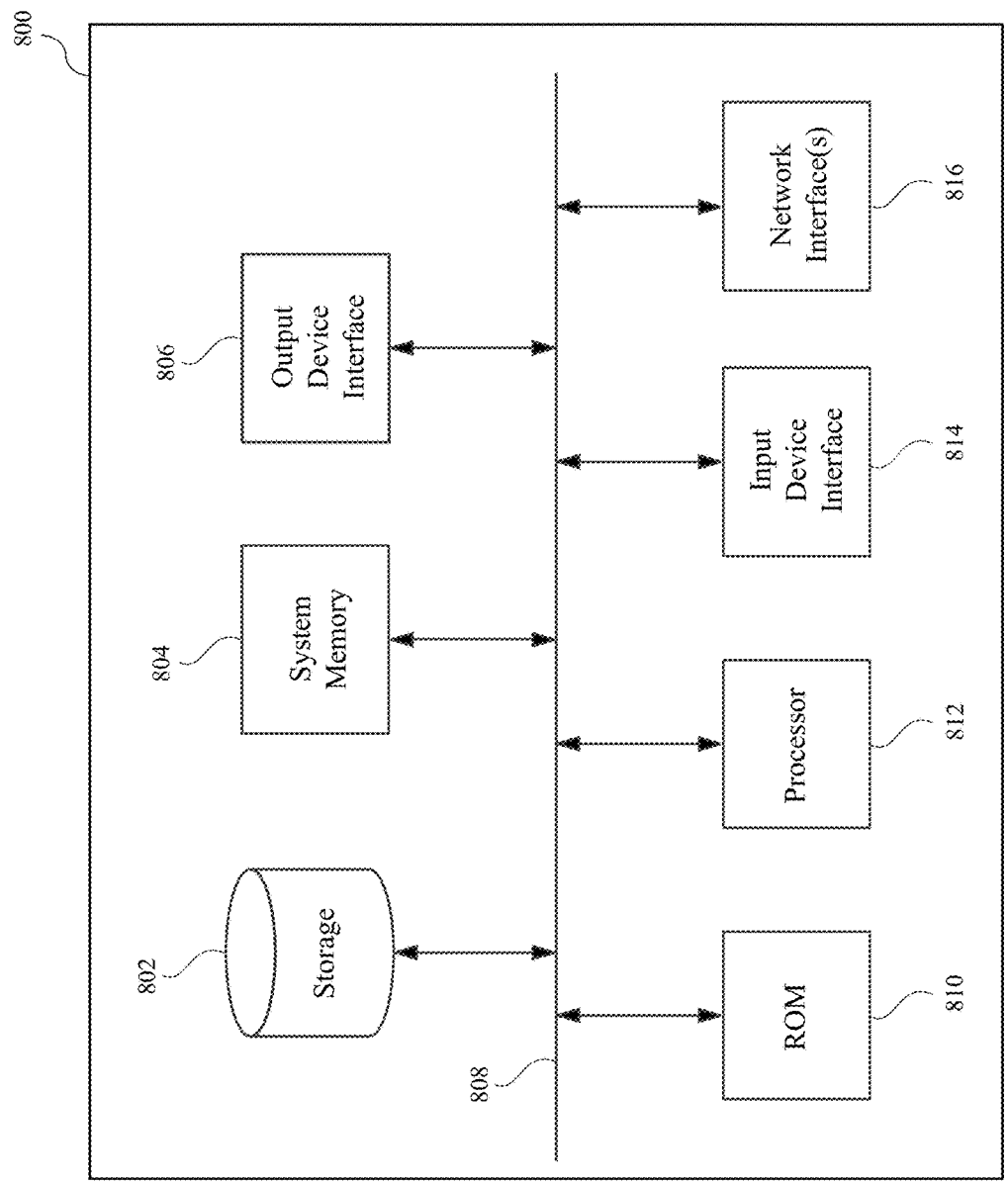
FIG. 8 conceptually illustrates an electronic system with which aspects of the subject technology may be implemented in accordance with one or more implementations.

FIG. 8 conceptually illustrates an electronic system 800 with which one or more implementations of the subject technology may be implemented. The electronic system 800, for example, can be a server, a switch, a router, a base station, a receiver, or generally any electronic device that transmits signals over a network. The electronic system 800 can be, and/or can be a part of, one or more of the electronic devices 102A-F shown in FIG. 1. Such an electronic system includes various types of computer readable media and interfaces for various other types of computer readable media. The electronic system 800 includes a bus 808, one or more processing unit(s) 812, a system memory 804 (and/or buffer), a read-only memory (ROM) 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic devices 102A-F shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   transmitter circuitry; and
   at least one processor circuit configured to:
      transmit a first signal to an other device in a first channel and, after a first amount of time elapses from initiating transmission of the first signal, open a first receive window for facilitating detection of a second signal to be received from the other device in the first channel;
      generate a first combined channel estimation for the first channel based at least on a first channel estimation received from the other device and a second channel estimation generated based at least on reception of the second signal from the other device in the first channel aligned to a time of opening the first receive window;
      transmit a third signal to the other device in a second channel and, after a second amount of time elapses, open a second receive window for facilitating detection of a fourth signal to be received from the other device in the second channel;
      generate a second combined channel estimation for the second channel based at least on a third channel estimation received from the other device and a fourth channel estimation generated based at least on reception of the fourth signal from the other device in the second channel aligned to a time of opening the second receive window; and
      estimate a time of arrival for a fifth signal based at least on an aggregation of the first and second combined channel estimations.

2. The device of claim 1, wherein the first amount of time equals the second amount of time.

3. The device of claim 1, wherein the first and second channels are non-adjacent.

4. The device of claim 1, wherein the first and second channels overlap.

5. The device of claim 1, wherein the at least one processor circuit is further configured to:
   open the first receive window irrespective of whether the second signal has been detected.

6. The device of claim 1, wherein the first receive window is opened prior to the second signal having been transmitted by the other device.

7. The device of claim 6, the second signal having been transmitted by the other device after the first amount of time elapses from the first signal having been detected by the other device.

8. The device of claim 1, wherein the first channel estimation is generated by the other device based at least on reception of the first signal aligned to a time that the other device detected the first signal.

9. The device of claim 1, wherein the first channel is associated with a first communication protocol and the second channel is associated with a second communication protocol different from the first communication protocol.

10. A method comprising:
    transmitting a first signal to an other device in a first channel and, after a first amount of time elapses from initiating transmission of the first signal, open a first receive window for facilitating detection of a second signal to be received from the other device in the first channel;
    generating a first combined channel estimation for the first channel based at least on a first channel estimation received from the other device and a second channel estimation generated based at least on reception of the second signal from the other device in the first channel aligned to a time of opening the first receive window;
    transmitting a third signal to the other device in a second channel and, after a second amount of time elapses, open a second receive window for facilitating detection of a fourth signal to be received from the other device in the second channel;
    generating a second combined channel estimation for the second channel based at least on a third channel estimation received from the other device and a fourth channel estimation generated based at least on reception of the fourth signal from the other device in the second channel aligned to a time of opening the second receive window; and
    estimating a time of arrival for a fifth signal based at least on an aggregation of the first and second combined channel estimations.

11. The method of claim 10, wherein the first amount of time equals the second amount of time.

12. The method of claim 10, wherein the first and second channels are non-adjacent.

13. The method of claim 10, wherein the first and second channels overlap.

14. The method of claim 10, wherein the method further comprises:
    opening the first receive window irrespective of whether the second signal has been detected.

15. The method of claim 10, wherein the first receive window is opened prior to the second signal having been transmitted by the other device, been transmitted by the other device after the first amount of time elapses from the first signal having been detected by the other device.

16. The method of claim 10, wherein the first channel estimation is generated by the other device based at least on reception of the first signal aligned to a time that the other device detected the first signal.

17. The method of claim 10, wherein the first channel is associated with a first communication protocol and the second channel is associated with a second communication protocol different from the first communication protocol.

18. The method of claim 10, wherein a sum of a time of arrival for the first signal at the other device and a time of arrival for the second signal is independent of a detection delay associated with the second signal, and wherein the detection delay is indicative of a time difference between a time of receipt of the second signal and a time of detection of the second signal.

19. A non-transitory computer-readable medium comprising instructions that, when executed by at least one processor, cause the at least one processor to perform operations comprising:
- transmitting a first signal to an other device in a first channel and, after a first amount of time elapses from initiating transmission of the first signal, open a first receive window for facilitating detection of a second signal to be received from the other device in the first channel;
- generating a first combined channel estimation for the first channel based at least on a first channel estimation received from the other device and a second channel estimation generated based at least on reception of the second signal from the other device in the first channel aligned to a time of opening the first receive window;
- transmitting a third signal to the other device in a second channel and, after a second amount of time elapses, open a second receive window for facilitating detection of a fourth signal to be received from the other device in the second channel;
- generating a second combined channel estimation for the second channel based at least on a third channel estimation received from the other device and a fourth channel estimation generated based at least on reception of the fourth signal from the other device in the second channel aligned to a time of opening the second receive window; and
- estimating a time of arrival for a fifth signal based at least on an aggregation of the first and second combined channel estimations.

20. The non-transitory computer-readable medium of claim 19, wherein the first amount of time equals the second amount of time.

21. The non-transitory computer-readable medium of claim 19, wherein the first and second channels are non-adjacent.

22. The non-transitory computer-readable medium of claim 19, wherein the first and second channels overlap.

23. The non-transitory computer-readable medium of claim 19, wherein the operations further comprise:
- opening the first receive window irrespective of whether the second signal has been detected.

24. The non-transitory computer-readable medium of claim 19, wherein the first receive window is opened prior to the second signal having been transmitted by the other device, the second signal having been transmitted by the other device after the first amount of time elapses from the first signal having been detected by the other device.

25. The non-transitory computer-readable medium of claim 19, wherein the first channel is associated with a first communication protocol and the second channel is associated with a second communication protocol different from the first communication protocol.

* * * * *